April 3, 1962  F. E. SWAIN  3,027,909
FLUID CONTROL VALVES

Filed June 3, 1958  4 Sheets-Sheet 1

INVENTOR
FRANK EDWARD SWAIN
Mackinney & Mackinney
ATTORNEYS

April 3, 1962 F. E. SWAIN 3,027,909
FLUID CONTROL VALVES
Filed June 3, 1958 4 Sheets-Sheet 2

INVENTOR
FRANK EDWARD SWAIN
Mawhinney & Mawhinney
ATTORNEYS

April 3, 1962   F. E. SWAIN   3,027,909
FLUID CONTROL VALVES

Filed June 3, 1958   4 Sheets-Sheet 3

INVENTOR
FRANK EDWARD SWAIN
Mackinney & Mackinney
ATTORNEYS

April 3, 1962 F. E. SWAIN 3,027,909
FLUID CONTROL VALVES

Filed June 3, 1958 4 Sheets-Sheet 4

INVENTOR
FRANK EDWARD SWAIN
Mawhinney & Mawhinney
ATTORNEYS 3,027,909
FLUID CONTROL VALVES
Frank E. Swain, 5a Kirloe Ave., Leicester Forest East, Leicester, England, assignor of one-half to David F. Wiseman & Sons Limited, Birmingham, England
Filed June 3, 1958, Ser. No. 739,587
Claims priority, application Great Britain June 6, 1957
6 Claims. (Cl. 137—219)

The invention relates to a fluid control valve, particularly to one of which the movable member is of considerable diameter (for example, of the order of 18 inches), which is to be used for controlling a high pressure fluid flow. Among the principal objects of the invention are to provide for efficient sealing between the movable member and a coacting seating in the closed condition of the valve without the movable member transmitting a heavy load to the seating, and so to support the movable member, which can be heavy in the case of a large-diameter valve, that it can be moved between its "open" and "closed" positions with an economical expenditure of effort.

According to the invention, the valve has its movable member shaped as a zone of a sphere, and the coacting seating member is resiliently distortable and provided with a frusto-conical, coacting seating surface, the movable member being supported for straight-line motion between an "open" position and a "closed" position in which latter it is located, by a stop, with its spheroidal zone engaged tangentially by the frusto-conical seating surface with a sealing pressure due solely to the resilient distortion of the seating member. In this way the bulk of the thrust load on the movable valve member is taken by the stop, with a minimum loading on the seating. The stop is preferably in the path of an actuating member for the movable valve member.

According to a further feature the movable member is supported for straight-line motion by a pair of oppositely-directed, co-planar links, the one ends of the links having pivotal connections with the movable valve member on the axis of the latter, and the other ends of the links being pivoted from the valve body such that while the plane of the movable member tilts during travel from one extreme position to the other its centre of gravity travels in a straight line and the planes of the movable valve member and seating surface are parallel in the closed condition.

According to a still further feature, the movable valve member is connected to be operated through a linkage which becomes substantially straightened when the movable valve member is effecting an efficient seal with the seating.

The linkage can take the form of two pairs of toggle links respectively arranged at opposite sides of the axis of the movable member to be parallel to each other, the outer ends of corresponding one toggle links of each pair having aligned pivotal connections with the movable valve member, and the outer ends of the other toggle links of each pair being fast with aligned pivot pins which are sealingly journalled in the valve body and of which at least one is fast with an external operating lever. It can be arranged for the latter to rest against an external stop when operated to the extreme position in which both pairs of toggle links have become substantially straightened with the movable valve member in its closed position.

The said outer ends of the corresponding one toggle links of each pair can be external to the movable valve member, the pairs of toggle links being accommodated in an annular space between the movable valve member and valve body; or in the case of a movable valve member having a hollow interior (e.g., one in the form of a hollow zone of a sphere) the said pairs of toggle links can be accommodated within the interior of the movable valve member and the latter be provided with slots through which extend the pivot pins fast at the outer ends of the said other toggle links of the pairs.

Accordingly to another feature, and in the case where the valve is for use, for example, for selectively diverting a fluid flow, there can be one of the seating members at each axial side of the movable member for selective co-action therewith, the seating members being in parallel planes.

According to yet another feature the (or each, as appropriate) seating member is sealingly supported from a body of the valve so as to be capable of floating movement in its radial plane for ensuring accurate sealing engagement by the movable member.

The invention is illustrated by way of example in the accompanying drawings, in which.

Figure 1:
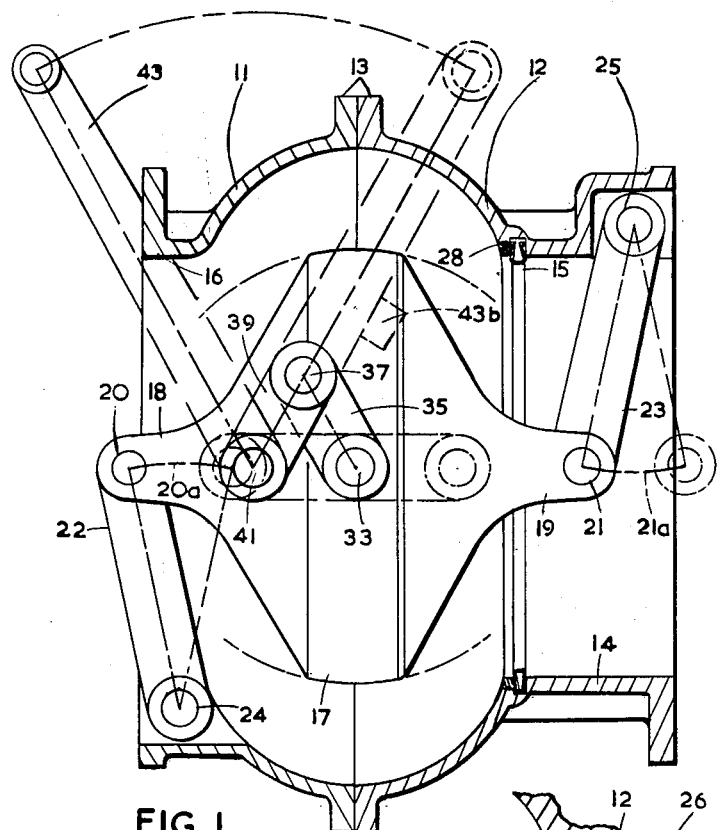
FIGURE 1 is a longitudinal section through a two-part casing of one form of the valve, showing the movable member, and its support and operating mechanism, in elevation.
Figure 2:
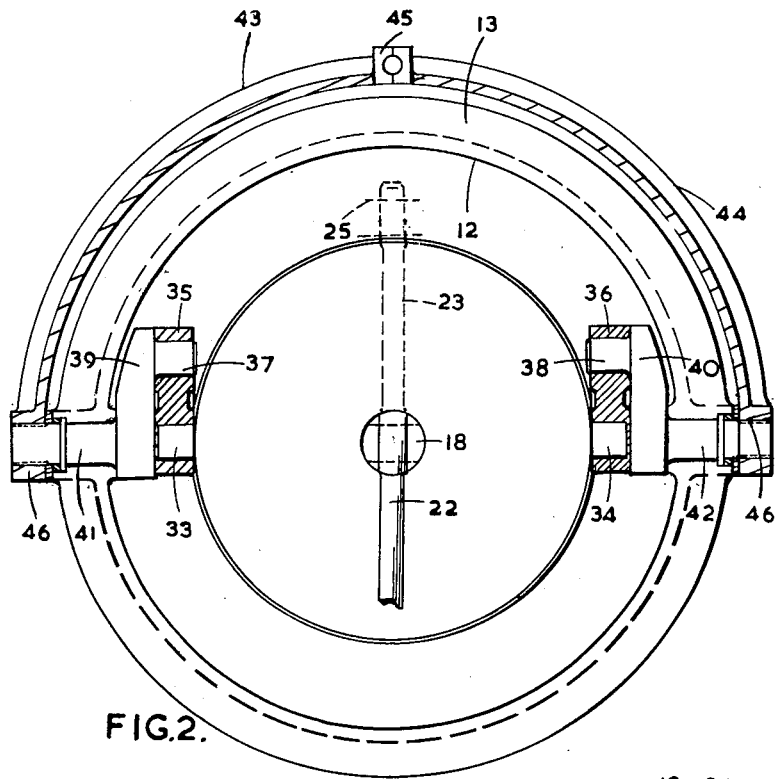
FIGURE 2 is an end view from the left of FIGURE 1, with the adjacent casing part removed.

Referring to FIGURES 1 and 2, the valve body, which is in two parts 11 and 12 with meeting flanges 13, 13 by which they are bolted together, is interiorly provided adjacent one end with a bore 14 containing a seating member which is indicated generally at 15 and will be hereinafter described.

Adjacent the opposite end of the valve body there is a second bore 16, and intermediate the inner ends of these bores the body is interiorly enlarged to provide annular clearance round the periphery of the movable member of the valve.

The said movable member has a central portion in the form of an equatorial zone 17 of a sphere and it can be formed, so as to be hollow for lightening purposes, from two complementary cup-like parts secured together at the lips. Axial extensions 18 and 19 at the ends have equi-spaced pivotal connections 20 and 21 at their outer ends with respective links 22 and 23 whose other ends are pivoted at 24 and 25 from the body. These links are co-planar and oppositely directed, and they are arranged to be at equal and opposite angles to a plane which is parallel to the seating member 15 in all positions of the movable valve member. In this way the arcuate paths indicated by the chain lines 20a and 21a, described by the pivotal connections 20 and 21 are equal and opposite, and the centre of the movable valve member travels in a straight path which is normal to the plane of the seating member 15. In other words, although the plane of the movable valve member will be tilted during its travel from one extreme position to the other, no effort has to be applied for moving it bodily against the influence of gravity. The positions of the pivotal connections 24 and 25 are chosen so that the median plane of the zone 17 is parallel to that of the seating member 15 in the closed position of the valve.

Figure 5:
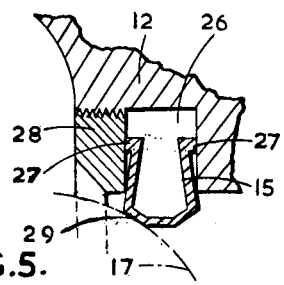
FIGURE 5 is an enlarged cross-sectional view of a seating member shown in FIGURES 1 and 3.

The seating member, shown to an enlarged scale in FIGURE 5, is in the form of a ring of resiliently distortable material (e.g., of metal, rubber or a suitable plastic) which is substantially of U cross-section with the mouth of the U facing radially outwardly. The ring has radial clearance in an annular, parallel-sided groove 26 of the body part 12, and the mouth of the U has oppositely-directed, out-turned lips 27, 27 which, due to a slight axial pre-compression of the ring, frictionally and sealingly engage the walls of the groove 26. The drawing shows that one side wall of the groove is provided by a ring nut 28 which engages a threaded portion of the body part 12 and which, when turned, applies a desired degree of axial pre-compression to the seating ring.

The latter at both margins of its inner periphery is chamfered at 29, at an angle which is tangential to the surface of the zone 17 when the movable member is in its closed position, to produce a frusto-conical seating at each side.

By supporting the ring 15 in this way, the radial clearance permits it, if necessary, to be moved against the slight frictional restraint of its engagement with the groove walls for becoming automatically centred with the zone 17 when the movable member is in its closed position. The radial clearance also permits the ring to expand and contract radially due to thermal expansion and mechanical stress variations. By providing the ring with a chamfer 29 at each side, the ring can be turned round for a renewed operative life when the chamfer at one side has become worn.

Figure 6:
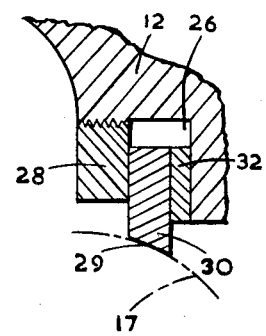
FIGURES 6 and 7 are enlarged cross-sectional views of two alternative forms of seating member.
Figure 7:
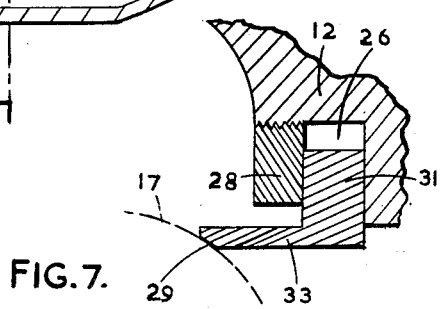

Instead of the ring of FIGURE 5, use could be made of the plain seating ring 30 of FIGURE 6, or the flanged seating ring 31 of FIGURE 7.

In FIGURE 6 the ring 30 is chamfered, as before, at 29 but the ring nut 28 works in conjunction with a resiliently compressible washer 32 (e.g., of rubber) for applying the frictional grip of the side walls of the groove to the sides of the ring 30.

The ring 31 of FIGURE 7, which is gripped frictionally by the ring nut 28, has an axial flange 33 directed towards the movable valve member and has the inner side of the flange lip chamfered, as before, at 29 to provide for a tangential sealing engagement with the zone 17.

For operating the movable member from one extreme position to the other it is provided with external, aligned stub shafts 33, 34 of which the common axis intersects the centre of the zone 17. These stub shafts are journalled in the corresponding one ends of a pair of toggle links 35, 36 of which the other ends are journalled on crank pins 37, 38 fast with crank throws 39, 40 acting as coacting toggle links. The latter are fast with aligned crankshafts 41, 42 which are journalled in mating semi-cylindrical recesses in the meeting edges of the casing parts 11 and 12. A loop-type operating handle, formed in two portions 43, 44 which are interconnected where they meet at 45, has its ends splined at 46 to the crankshafts.

FIGURE 1 shows in full lines the position of the movable member, and the associated movable parts, when the valve is fully open, and indicates by chain lines the positions when the valve is closed. When fully open the cross-sectional area of the annulus between the movable member and casing is arranged to be substantially the same as that of the bore 14, and it will be seen that when the valve is closed the crank-throws 39, 40, and the associated links 35, 36 become substantially aligned, thus offering the optimum mechanical advantage when the valve is to be opened. It will also be seen that as the centre of the zone 17 moves in a straight line the surface of the zone will always be properly presented to the seating ring even if the movable member should be slightly tipped endwise when in the closed position. Thus the seating ring can be arranged to be stressed, in the closed position of the valve, solely by its own resilient resistance to distortion in the axial direction, and not by the pressure of the fluid tending to urge the movable member towards it, this last-mentioned stress being supported by an external stop 43b engaged by the operating handle when the valve is closed. Another stop (not shown) is provided for limiting the movement of the handle when opening the valve. In order to adapt the valve for diverting the flow of a fluid, the valve body would be provided with a seating ring 15 in each end, and with a lateral communication intermediate the two seatings. The movable valve member would be supported as above described and so that its plane will be parallel to whichever of the two seatings it engages.

Figure 3:
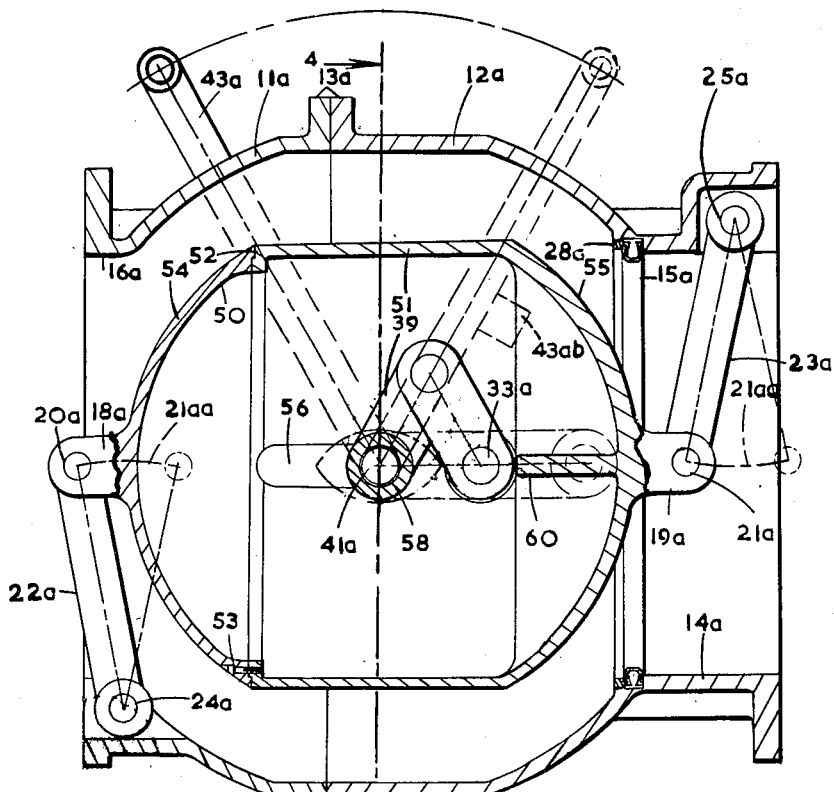
FIGURE 3 is a longitudinal section through the two-part casing and movable member of another form of the valve.
Figure 4:
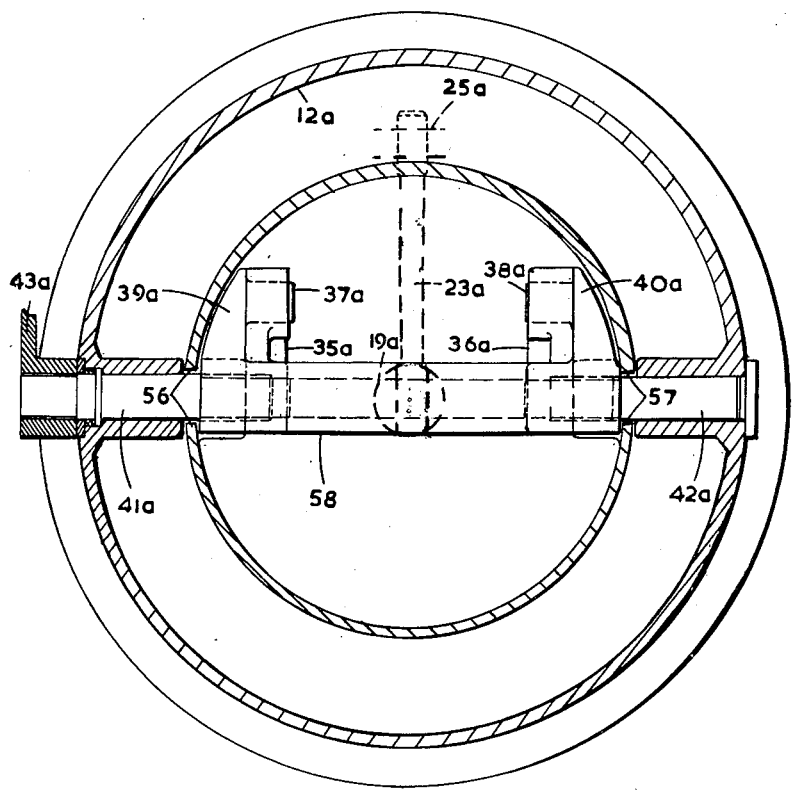
FIGURE 4 is a section on the line 4—4 of FIGURE 3.

Excepting where the structure is different, the same reference numerals, suffixed "a," as have previously been used indicate like parts of the construction illustrated by FIGURES 3 and 4. The main difference in the last-mentioned construction is in the form of the movable valve member and the means for operating it from one extreme position to the other.

The movable member of FIGURES 3 and 4 is shown formed in two parts 50, 51 which are hollow and have a spigotal fitting at 52, locked by a circle of screws of which one is shown at 53. The axial ends of the movable member are spherically domed at 54, 55, and domed end 55 in FIGURE 3 being for coaction with a seating ring 15a which is capable of floating radial movement as before and can be of any of the types previously described. It will at this stage be understood that the dome 54 provides for a substantially stream-lined flow for the fluid passing through the valve; and that the casing part 11a could be formed in precisely the same way as the casing part 12a and be provided with a seating ring 15a adjacent its bore 16a, and the casing be provided with a lateral bore in a position intermediate the two seating rings so that the valve could be used for diverting a fluid flow.

In the construction of FIGURES 3 and 4 the crankshafts are composite and include stub shafts 41a and 42a which are made sufficiently long to extend, with clearance, through longitudinal slots 56, 57 in the part 51 of the movable member so that the crank throws 39a, 40a are within the latter. The crank throws are fast with a tube 58 into the ends of which the stub shafts are splined. The coacting links 35a, 36a are journalled on aligned stub shafts 33a fast within the part 51. A stiffener for the latter is provided by an internal transverse web 60.

The clearance provided for the stub shafts 41a, 42a by the slots in the movable valve member is for enabling the latter to partake of the slight tilting movement imparted to it, by the links 22a, 23a, while moving from one extreme position to the other. By supporting the outer ends of the links 22a, 23a on rotatably adjustable eccentric pins housed in the valve body provision could be made for adjusting the position of the movable valve member.

What I claim as my invention and desire to secure by Letters Patent of the United States is:

1. A valve for controlling the flow of a high-pressure fluid comprising a valve body, said valve body provided with an internal valving chamber and with inlet and outlet passages communicating with said chamber, a movable valve member in said valving chamber and having an operative surface shaped as a zone of a sphere, a coacting seating member, said valve body having an annular channel of greater diameter than said seating member, said seating member supported in said annular channel of said valve body so that it can move in its plane to be coaxially about one of said passages and the spherical zone, said seating member being of channel cross-section with the mouth of the channel within the annular channel of said valve body, said seating member provided with a frusto-conical seating surface, means supporting said movable valve member for substantially straight-line motion towards and away from said seating respectively to close and open said one passage, said seating being resiliently distortable in the direction of said substantial straight-line motion, said movable valve member when in the closed position having its spherical zone engaging the frusto-conical surface of said seating tangentially and compressing said seating in an axial direction, and stop means for said movable valve member when in its closed position, said stop means arresting movement of said movable valve member in the closing direction after said zone engages said frusto-conical surface such that said stop will support the pressure of the high-pressure fluid acting on said movable valve member and not crush said seating member, and such that a sealing pressure between said movable valve member and said seating member will be due solely to the extent of the resilient distortion of the latter permitted by said stop.

2. A valve for controlling the flow of a high-pressure fluid comprising a valve body, said valve body provided with an internal valving chamber and with inlet and outlet passages communicating with said chamber, a movable valve member in said valving chamber and having an operative surface shaped as a zone of a sphere, a coacting seating member, said valve body having an annular channel of greater diameter than said seating member, said seating member supported in said annular channel of said valve body so that it can move in its plane to be coaxially about one of said passages and the spherical zone, said seating member being of channel cross-section with the mouth of the channel within the annular channel of said valve body, said seating member provided with a frusto-conical seating surface, means supporting said movable valve member for substantially straight-line motion towards and away from said seating respectively to close and open said one passage, said seating being resiliently distortable in the direction of said substantial straight-line motion, said movable valve member when in the closed position having its spherical zone engaging the frusto-conical surface of said seating tangentially and compressing said seating in an axial direction, an actuator, means connecting said actuator to operate said movable valve member, and stop means engaged by said actuator when said movable valve member is in its closed position, said stop means arresting movement of said movable valve member in the closing direction after said zone engages said frusto-conical surface such that said stop will support the pressure of the high-pressure fluid acting on said movable valve member and not crush said seating member, and such that a sealing pressure between said movable valve member and said seating member will be due solely to the extent of the resilient distortion of the latter permitted by said stop.

3. A valve for controlling the flow of a high-pressure fluid comprising a valve body, said valve body provided with an internal valving chamber and with inlet and outlet passages communicating with said chamber, a movable valve member in said valving chamber and having an operative surface shaped as a zone of a sphere, a coacting resilient seating member supported from said valve body coaxially about one of said passages and provided with a frusto-conical seating surface, means supporting said movable valve member for substantially straight-line motion towards and away from said seating respectively to close and open said one passage, said seating being resiliently distortable in the direction of said substantial straight-line motion, said movable valve member when in the closed position having its spherical zone engaging the frusto-conical surface of said seating tangentially and compressing said seating in an axial direction, an actuator, a linkage connecting said actuator to said movable valve member for operating the same, and stop means engaged by said actuator when said movable valve member is in its closed position, said linkage being substantially straightened when said movable valve member is in closed position, said stop means arresting movement of said movable valve member in the closing direction after said zone engages said frusto-conical surface such that said stop will support the pressure of the high-pressure fluid acting on said movable valve member and not crush said seating member, and such that a sealing pressure between said movable valve member and said seating member will be due solely to the extent of the resilient distortion of the latter permitted by said stop.

4. A valve for controlling the flow of a high-pressure fluid comprising a valve body, said valve body provided with an internal valving chamber and with inlet and outlet passages communicating with said chamber, a movable valve member in said valving chamber and having an operative surface shaped as a zone of a sphere, a coacting resilient seating member supported from said valve body coaxially about one of said passages and provided with a frusto-conical seating surface, a pair of links respectively pivoted at one end to said movable valve member adjacent opposite axial ends thereof, said links extending laterally in substantially opposite directions from said movable valve member, said links at their opposite ends pivoted from said valve body such that said links support said movable valve member for substantially straight-line motion towards and away from said seating respectively to close and open the valve, said seating being resiliently distortable in the direction of said substantial straight-line motion, said movable valve member when in the closed position having its spherical zone engaging the frusto-conical surface of said seating tangentially and compressing said seating in an axial direction, and stop means for said movable valve member when in its closed position, said stop means arresting movement of said movable valve member in the closing direction after said zone engages said frusto-conical surface such that said stop will support the pressure of the high-pressure fluid acting on said movable valve member and not crush said seating member, and such that a sealing pressure between said movable valve member and said seating member will be due solely to the extent of the resilient distortion of the latter permitted by said stop.

5. A valve for selectively diverting a flow of a high-pressure fluid between either of two aligned passages and an intermediate lateral passage comprising a valve body interiorly provided with two aligned passages and an intermediate lateral passage, said valve body provided with an internal valving chamber with which said passages communicate, a movable valve member in said valving chamber and having adjacent each end an operative surface shaped as a zone of a sphere, a respective coacting resilient seating member provided with a frusto-conical seating surface in each of said aligned passages, means supporting said movable valve member for substantially straight-line motion between said seatings respectively to close and open said aligned passages alternatively, each said seating being resiliently distortable in the direction of said substantial straight-line motion, said movable valve member when engaging either of said seatings having its spherical zone engaging the frusto-conical surface of said seating tangentially and compressing said seating in an axial direction, and stop means for said movable valve member when in the position to close either of said aligned pasages, said stop means arresting movement of said movable valve member in the closing direction after said zone engages said frusto-conical surface such that said stop will support the pressure of the high-pressure fluid acting on said movable valve member and not crush said seating member, and such that a sealing pressure between said movable valve member and said seating member will be due solely to the extent of the resilient distortion of the latter permitted by said stop.

6. A fluid control valve, according to claim 3, in which the linkage takes the form of two pairs of toggle links respectively arranged at opposite sides of the axis of the movable member to be parallel to each other, the outer ends of corresponding one toggle links of each pair having aligned pivotal connections with the movable valve member, and the outer ends of the other toggle links of each pair being fast with aligned pivot pins which are sealingly journalled in the valve body and of which at least one is fast with the external operating lever.

References Cited in the file of this patent

UNITED STATES PATENTS 25,349    Powell ---------------- Sept. 6, 1859

(Other references on following page)

UNITED STATES PATENTS

| | | |
|---|---|---|
| 280,136 | Cooper | June 26, 1883 |
| 809,895 | Beazley | Jan. 9, 1906 |
| 1,520,117 | Buehle | Dec. 23, 1924 |
| 2,151,442 | Roberts | Mar. 21, 1939 |
| 2,442,625 | Thomas | June 1, 1948 |
| 2,631,811 | Malloy | Mar. 17, 1953 |
| 2,653,004 | Schnyder | Sept. 22, 1953 |
| 2,662,721 | Gianzne | Dec. 15, 1953 |
| 2,814,458 | Jones | Nov. 26, 1957 |
| 2,854,989 | Worlidge | Oct. 7, 1958 |
| 2,929,401 | Cowan | Mar. 22, 1960 |

FOREIGN PATENTS

| | | |
|---|---|---|
| 917,221 | Germany | Aug. 26, 1954 |